United States Patent [19]

Parker et al.

[11] Patent Number: 5,770,259

[45] Date of Patent: Jun. 23, 1998

[54] QUANTITATIVE TINTING

[75] Inventors: Theodore L. Parker, Danville; David S. Soane, Piedmont, both of Calif.

[73] Assignee: 2C Optics, Inc., Hayward, Calif.

[21] Appl. No.: 337,645

[22] Filed: Nov. 10, 1994

[51] Int. Cl.$^6$ .................................................. B05D 5/06
[52] U.S. Cl. .................... 427/164; 427/240; 427/393.5; 427/430.1; 427/412.1; 427/512; 427/514
[58] Field of Search ................................. 427/164, 240, 427/430.1, 512, 514, 393.5, 209, 412.1

[56] References Cited

U.S. PATENT DOCUMENTS

| | | | |
|---|---|---|---|
| 4,556,605 | 12/1985 | Mogami et al. | 428/331 |
| 4,559,059 | 12/1985 | Su | 427/164 |
| 4,594,288 | 6/1986 | Dobigny et al. | 428/339 |
| 4,668,240 | 5/1987 | Loshaek | 427/164 |
| 4,824,688 | 4/1989 | Covington | 427/164 |
| 5,102,695 | 4/1992 | Guest et al. | 427/164 |
| 5,110,514 | 5/1992 | Soane | 264/22 |
| 5,114,632 | 5/1992 | Soane | 264/22 |
| 5,272,010 | 12/1993 | Quinn | 427/164 |

*Primary Examiner*—Janyce Bell
*Attorney, Agent, or Firm*—Needle & Rosenberg, P.C.

[57] ABSTRACT

Plastic lenses are provided wherein a tinting agent is provided within the coating to impart color to the lens. Methods are provided whereby such coatings can be applied to plastic lenses using radiation or thermal curing techniques with a plastic coating.

25 Claims, 1 Drawing Sheet

QUANTITATIVE TINTING

BACKGROUND OF THE INVENTION

Most ophthalmic lenses dispensed are made from plastic materials, since they can be made to be optically clear, to provide good imaging qualities and can also be made to reduce the transmittance of incident light to the eye for use in sunglasses, fashion lenses, prescription sport masks, face shields, goggles and the like. The process of treating a clear, colorless plastic material to reduce the transmission of light is known in the art as tinting, which addresses the wavelengths of light which are transmitted and absorbed, and the degree of absorption at each wavelength. In many instances the tint will have a desired color and the saturation of that color will determine the overall attenuation of the transmitted light to the eye. For example, as much 75 to 80% reduction of the incident light reaching the eye can be obtained by tinting.

There are three basic materials used for plastic lenses. Diethylene glycol bisallyl carbonate, known as CR-39, and various types of polycarbonates (PC) are the major materials. Polymethylmethacrylate (PMMA) is a third material used for making plastic lenses.

The process usually used for tinting these plastic lenses involves dipping the plastic lens into an aqueous bath of dye at a temperature usually in the range of 90° to 95° C. The exposure time is usually in the range of 10 to 60 minutes. However, among the three materials used to make plastic lenses, CR-39 is the only material which can accept dye in this manner from an aqueous solution, and it is stable to elevated temperatures. However, the tint obtained by this method typically is not uniform due to the differential diffusion of the water soluble dye into the organic polymer matrix.

It is thus and object of this invention to provide a method for improving the uniformity of tint on plastic lenses.

To achieve a large diminution in the level of light transmitted through the lens or article, soaking periods as long as one hour are required for sufficient dye to diffuse from a hot, aqueous bath into bulk plastic. It is thus a further object of the invention to provide a rapid method to achieve a tint having a low light transmission value.

The material CR-39 has low scratch and abrasion resistance, however, the present invention provides tinted CR-39 with improved scratch and abrasion resistance. It is thus a further object of this invention to provide a tinted lens or optical article with improved resistance to scratches and abrasion damage.

The CR-39 surface is a difficult one to which to bond coating materials, and many coatings will debond or delaminate and fail standard cross-hatch tape peel tests. It is thus a further object of the invention to provide an adhesion promoting primer composition that may be applied to CR-39 or other optical plastic surfaces to provide a bond to the tinting coating layer.

Polycarbonate lenses do not accept dye directly, so these must be coated with a material that does accept the dyes. The PMMA material cannot withstand the required bath temperatures due to its low glass transition-temperature and thus cannot be tinted by this method even if a coating is used which does accept tinting by the hot bath method.

Accordingly, it is an object of the present invention to provide a method for quantitative tinting of plastic ophthalmic lenses and other optical articles by covering one or both surfaces of the plastic lens with a coating containing a light-absorbing dye or pigment, then converting the coating to a hard state by exposure to actinic radiation or mild heat. By this method all three of the primary materials used to make plastic lenses, including PMMA, may be quantitatively tinted to obtain desired reductions of incident light reaching the eye.

These and other objects of the invention will be apparent from the following description and from the practice of the invention.

SUMMARY OF THE INVENTION

The present invention provides a method for quantitative tinting of ophthalmic lenses, other castable plastic lenses, and other fabricated plastic optical articles including plastic sheet stocks and films. The tinting resin is first applied to one or all surfaces of the plastic optical article, such as an ophthalmic lens face, using techniques such as spin coating, dip coating or any of the wiping techniques. Generally, complex shapes will preferable be tinted using a dip technique, whereas flat surfaces, such as ophthalmic lenses, may be tint coated by a variety of techniques available to the process designer. The film is then cured using UV radiation. Curing may also be accomplished by mild heating at temperatures below the glass transition temperatures of the lens materials.

The hue or color of the lens can be controlled by the choice of dye or pigment used in the tinting coating, and the degree to which the intensity of the incident light is reduced, the transmission loss, can be controlled by the thickness of the applied coating. This thickness can be quantitatively specified by several methods. In a spin coating process the final coating thickness will be a function of the coating viscosity, the spin speed and the spin duration. The spin duration may be from a few seconds to a few minutes and the spin speed will generally be from 10 to 10,000 rpm and the viscosity in the range of from about 5 to 5000 cps. If the lens is dip-coated, the thickness can be controlled by the solids level (the amount of neat coating dissolved in a carrier solvent). Dip coating will result in coating all surfaces, or both sides for an ophthalmic lens. This is a less preferred configuration, since typically only the backside of a lens receives a tinted coating.

The tinting coating may be applied to a preformed lens. Some plastics, such CR-39, will require application of an adhesion promoting primer layer before applying the hard overlayer coating since the materials in the coating are not optimally compatible with CR-39. It is contemplated that the tinting dyes or pigments may be used either in the primer layer, in the hard overlayer, or both. In some instances the primer layer will only contain the tinting and the hard overlayer will be clear. Use of a clear overlayer gives the appearance of a deeper hue and higher gloss which in some instances is desirable.

For polycarbonate lenses, which must receive a dye accepting coating because they cannot be dyed directly by the hot water bath method, the currently used coatings have low scratch resistance properties. The coatings according to the present invention are believed to have superior scratch resistance as well as containing a tint. While a primer is not required for polycarbonate to receive a coating of the present invention, however, a dual coating comprising a tinted underlayer and a hard, clear overlayer can provide a deep and glossy appearance which is desirable for cosmetic and fashion properties.

The coatings of the invention may also be applied when a lens is cast. The mold may be filled with a reactive casting resin that is compatible with the reactive materials in the coating and preferably contains at least one of the reactive components of the coating, preferably containing reactive ethylenically unsaturated groups. The tinting coating is first applied to at least a first face of the mold used to manufacture the lens or ophthalmic device, wherein the face imparts a desired optical configuration to a first optical surface of the ophthalmic device. The tinted composition is then preferably reacted to a degree that it forms a nonabrasion-resistant film (to serve as the lens coating) that is wet, at least weakly adhered to the first face, and replicates the first face in an aberration-free manner. The mold is filled with an organic liquid material capable of hardening to a solid, room temperature-stable state wherein the organic liquid material is thermodynamically compatible with the tinting coating composition comprising reactive ethylenically unsaturated groups. The lens material and tinting coating are concurrently hardened to form the ophthalmic device.

Alternatively, if the viscosity of the tinting coating is sufficiently higher than the viscosity of the lens material, the partial reacting of the coating material prior to applying the lens material to the molds may not be necessary.

DESCRIPTION OF THE PREFERRED EMBODIMENTS

Figure 1:
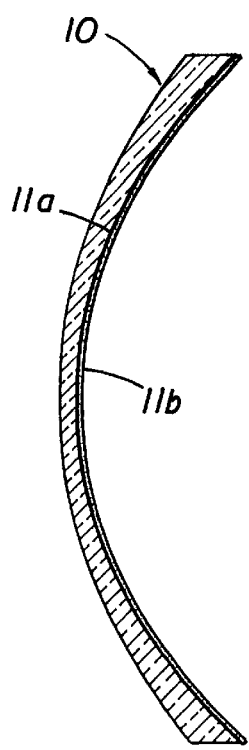
FIGS. 1, 2, 3, 4, 5 and 6 illustrate embodiments of the invention with preferred choices of coatings and surfaces on the front and back of a lens.

One class of abrasion resistant, curable, tint agent-containing, coating compositions utilized in accordance with the present invention which are curable under vacuum or in inert atmosphere such as nitrogen, comprise:

I. Ten to fifty parts of polyacryloylated alkane polyols, wherein the alkane polyols contain up to about 48 carbon atoms and an average of at least three O-acryloyl groups;

II. Twenty to eighty parts of alkane polyols, wherein the alkane polyols contain up to about 20 carbon atoms and an average of at least three O-[acryloyl-(polyalkylene oxide)] chains; wherein each of the polyalkylene oxide chains comprise from one to twenty alkylene oxide groups;

III. A tinting agent selected from the group consisting of dyes, pigments and mixtures of thereof in an amount sufficient to provide the transmission of a predetermined amount of incident light therethrough, and impart a predetermined color.

The composition will also contain a photoinitiating amount of a photoinitiator, typically between 0.1 and about six parts. Viscosity modifiers, typically up to 500 parts may be added, as well as dyes, surfactant and adhesion promoters may also be included in the composition in small amounts.

All parts are by weight described herein.

Another class of an abrasion-resistant, curable coating compositions used in accordance the present invention can be cured in-the presence of air, under vacuum, or in inert atmosphere, such as nitrogen, and comprise:

I. Twenty to forty parts of polyacryloylated alkane polyols, wherein the alkane polyols contain up to about twenty carbon atoms and an average at least three O-acryloyl groups;

II. Fifty to eighty parts of alkane polyols, wherein the alkane polyols contain up to about 48 carbon atoms and an average of at least three O-[acryloyl-(polyalkylene oxide)] chains; wherein each of the polyalkylene oxide chains comprise from one to twenty alkylene oxide groups;

III. A tinting material selected from dyes, pigments and mixtures thereof in an amount sufficient to provide the transmission of a predetermined amount of the incident light, and to impart a predetermined color; and IV. Optionally, one to thirty parts of an acrylated material which promotes adhesion of the cured coating composition to the substrate.

This composition will also contain a photoinitiating amount of a photoinitiator, typically 0.1 to about six parts, as well as optional viscosity modifiers, dyes and surfactant.

Another class of an abrasion-resistant, curable coating compositions used in accordance with the present invention comprise:

I. Twenty to seventy parts of alkane polyols, wherein the alkane polyols contain up to about forty eight carbon atoms and average at least three O-[acryloyl-(polyalkylene oxide)] chains; wherein each of the polyalkylene oxide chains comprise from one to twenty alkylene oxide groups;

II. Fifteen to seventy five parts of a polyacrylated urethane, wherein the urethane has a molecular weight of about 2500 or less and an average of at least three acrylate groups;

III. A tinting material selected from dyes, pigments and mixtures thereof in an amount sufficient to provide the transmission of a predetermined amount of the incident light, and to impart a predetermined color; and IV. Optionally, twenty to seventy parts of polyacryloylated alkane polyols wherein the alkane polyols contain an average of at least three O-acryloyl groups;

V. Optionally, one to twenty five parts of a mono vinyl functional reactive diluent.

This composition will also contain a photoinitiating amount of a photoinitiator, typical one tenth to about six parts, as well as optional dyes, surfactants and stabilizers.

Preferred adhesion promoting, curable, primer compositions utilized in accordance with the present invention comprise:

I. Thirty to eighty parts of an acrylated material which promotes adhesion of the cured primer coating to the substrate;

II. One to seventy parts of a mono vinyl functional reactive diluent; and

III. Optionally, one to fifty parts of alkane polyols, wherein the alkane polyols contain up to about forty eight carbon atoms and average at least two O-[acryloyl (polyalkylene oxide)] chains; wherein each of the polyalkylene oxide chains comprise from one to twenty alkylene oxide groups;

IV. Optionally, a tinting material selected from dyes, pigments and mixtures thereof in an amount sufficient to provide the transmission of a predetermined amount of the incident light, and to impart a predetermined color.

This composition will also contain a photoinitiating amount of a photoinitiator, typical one tenth to about six parts, as well as optional dyes, surfactants and stabilizers.

Acrylated material which promote adhesion include, but are not limited to acrylated urethane, acrylated ester and acrylated epoxy oligomers. Monovinyl functional reactive diluents include, but are not limited to mono acrylate esters.

The tinting compositions are useful on plastic ophthalmic lenses. The tinting compositions are advantageous when used with compatible organic material which can be hardened into ophthalmic lenses.

Referring to FIG. 1, a preferred embodiment of the use of the coating compositions and primers includes a plastic lens 10, preferably polarized, having a tinted primer 11a on one surface thereof and an untinted coating according to the invention which provides a hard topcoat 11b. The coated surface is preferably the back (concave) side of the lens. Alternatively, the primer 11a may be untinted and the hard topcoat 11b will be tinted.

Figure 2:
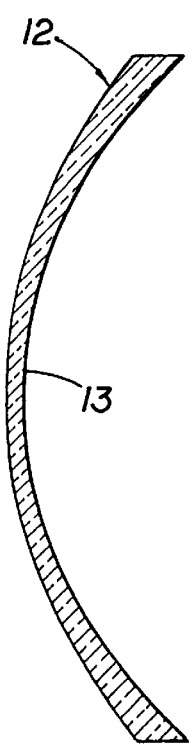

Referring to FIG. 2, a second preferred embodiment is a plastic lens 12, preferably polarized, having a coating 13 on the back side containing a mixture of three primary color notch filters which control the overall transmission spectrum of light reaching the eye. The mixture of three primary color notch filters in a coating is referred to herein as a tri-band coating.

Figure 3:
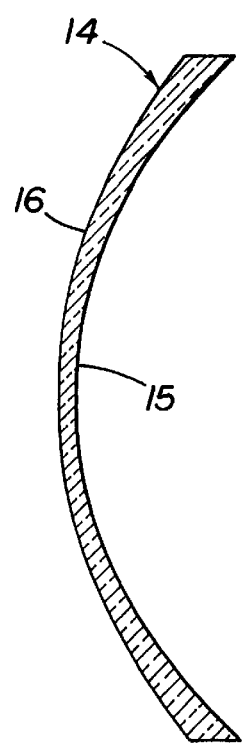

Referring to FIG. 3, a third embodiment is a plastic lens 14 having a coating 15 on the back side containing a first photochromic dye, and a coating 16 on the front side containing a second photochromic dye, which thereby provide a color intermediate to the two dyes. Pigments and mixtures of dyes and pigments may also be used in the coatings.

Figure 4:
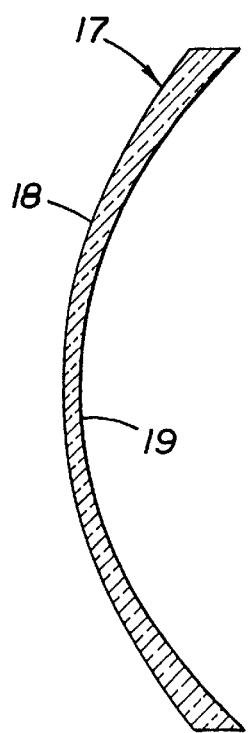

Referring to FIG. 4, a fourth embodiment is a plastic lens 17 having a coating 19 on one side, preferably the back side, containing dye and/or pigment, and a coating 18 on the opposite side (the front side) containing a photochromic dye.

Figure 5:
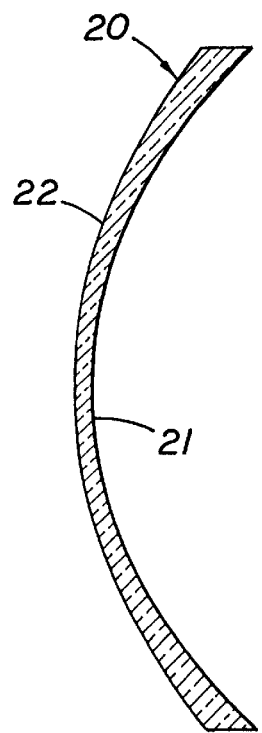

Referring to FIG. 5, a fifth embodiment is a plastic lens 20 having a coating 21 on one side, preferably the back side, containing a dye and/or pigment, and having a mirror surface 22 on the opposite side (the front side). Mirror surfaces are known in the art.

Figure 6:
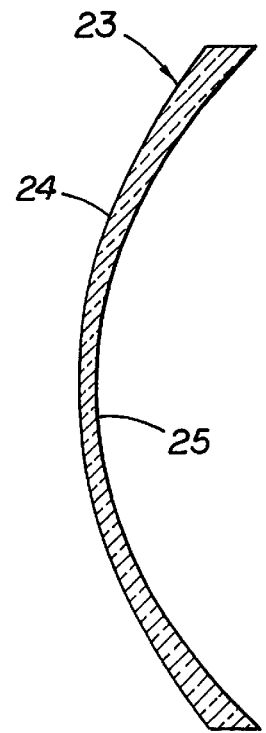

Referring to FIG. 6, a sixth embodiment is a plastic lens 23 having a coating 24 on one side, preferably the front side, containing a dye and/or pigment, and having an anti-reflective (AR) coating 25 on the other (back) side. Anti-reflective coatings are known in the art.

The tinting material may be a dye, a pigment or mixtures thereof. Included within the scope of dyes and pigments according to the present invention are such materials as colloidal powders of anti-reflective dielectic materials which may be used to vary the optical density of the lens. Other tinting materials may be colloidal inorganic or metallic particles which, when incorporated into the coating, can form a reflective or iridescent layer. The photochromic dyes may also be used to provide tints which vary intensity by responding to the ambient light. It is also contemplated that multiple coatings containing tinted materials may be used to provide, for example, three separate coatings, each containing one of the three primary colors. In this manner the color and intensity of the lens can be controlled by way of the three coatings.

Additionally, one color may be coated on the front side of an ophthalmic lens and a different color may be coated on the back side to again control the overall color and intensity of light reaching the eye. If the tinted coating is applied to a flat surface or lens by drizzling or spraying prior to spinning in a spin coating process, then two or three resins containing different colors may be delivered from separate reservoirs and mixed at the spray or nozzle head immediately before application to the plastic optical surface to achieve a desired intermediate color and transmission.

The tinting compositions are applied to the optical surfaces of the mold using conventional methods such as spin coating, flow coating, spray coating, dipping, wiping and other methods well-known to those of ordinary skill in the ophthalmic lens coating art. A typical spin coating method of coating ophthalmic lenses is described, for example, in U.S. Pat. No. 5,246,728. A typical coating will have a thickness of one to fifteen microns and it is realized that the thickness applied by spin coating is correlated to the viscosity of the material and the rotational speed of the spinning process.

After application of the coating, it is preferably partially cured by exposure to radiation, such as radiation from a high energy ultraviolet light source, for several seconds. Typical UV radiation sources include an electrodeless tube lamp (made by Fusion Systems) or a medium pressure mercury vapor lamp tube (made by American Ultraviolet Products). The preferred wavelengths for photoinitiation are between 180 and 500 nanometers and the power output of the light source is preferably between about twenty and 500 watts per inch of the source length. The articles may be cured by placing them under a lamp for the desired period of time or by passing the articles in front of the lamp on a conveyor system. Articles which are coated on both sides may have both sides cured simultaneously by using light sources on each side of the article. It is possible, but not preferable, to thermally cure the coating as well. After partial curing, the coating surface will still be wet and can be removed from the mold by touching or wiping with a finger. The photoinitiated curing reactions of the compositions according to the present invention involve free-radical polymerization. Examples of such photoinitiators are Darocure 1173, Irgacure 184, and a 1:1 mixture of benzophenone and Darocure 1173 (Irgacure 500), or Irgacure 907.

The polyacryolated alkane polyols will contain up to twenty carbon atoms and have an average of over two O-acryloyloxy groups and have the following formula

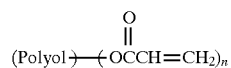

wherein n is greater or equal to three and the "polyol" portion is an alkane polyol having up to about twenty carbon atoms. It will be understood that the polyacryolated alkane polyols need not be, and typically are not, pure compounds, but rather are provided as a mixture of compounds wherein the alkane polyol has a plurality of alcohol groups, some of which may be acryolated and some of which may be free hydroxyl groups. Thus, the alkane polyols are described as containing an average number of O-acryloyl groups.

The alkane polyol refers to a polyhydroxy alkane wherein the alkane may be a straight, branched or cyclic alkane containing up to about twenty carbon atoms. Preferably, branched alkane polyols are utilized, such as tetra-(2-hydroxy-ethyl)-methane; 3, 4, 5, 6-tetra-(2-hydroxy-ethyl)-1-hydroxy-heptane, 2-ethyl-2(hydroxymethyl)-1,3-propanediol, and the like.

As used herein it will also be understood that methacrylate can be substituted for an acrylate group and they are viewed as being equivalent to each other within the context of the present invention.

As used herein the term "alkylene oxide" is a divalent group comprising an alkyl chain bonded to an oxygen atom with open valences on the oxygen atom and on one of the carbon atoms in the alkyl chain. Hence, ethylene oxide is —CH$_2$—CH$_2$—O, propylene oxide is —CH(CH$_3$)—CH$_2$—O—, etc.

Examples of the polyacrylated alkane polyols having up to twenty carbon atoms and at least three acryoloxy groups are Sartomer 9041 (a dipentaerythritol multiacrylate), Sartomer 295 (a pentaerythritol tetraacrylate), Sartomer 399 (a dipentaerythritol pentaacrylate) and Radcure TMPTA (trimethylolpropane triacrylate).

A polyalkoxylated polyacrylated alkane polyol of component II will contain up to about twenty carbon atoms and an average of at least three O-acryloyl groups. Preferred compounds containing [acryloyl-(polyalkylene oxide)] chains have the following formula

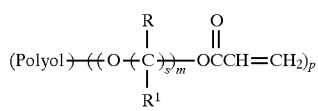

wherein p greater than 2, each m is independently an integer from one to twenty, s is from one to six, and each R and $R^1$ is independently H, lower alkyl or hydroxy alkyl, preferably methyl or hydroxymethyl. In compositions wherein the polyalkylene oxide chains comprise from four to six alkylene oxide groups, then each m is independently an integer from four to six. Preferably the alkylene oxide groups are ethylene oxide or propylene oxide, i.e. wherein compounds wherein s is two, and both R and $R^1$ groups are H or one R (or $R^1$) group is H and other R (or $R^1$) group is methyl. Examples of such compounds include Sartomer 454 (ethoxylated TMPTA), Sartomer 502 (a highly ethoxylated TMPTA), Sartomer 494 (ethoxylated pentaerythritol tetraacrylate) and Sartomer 9035 (a highly alkoxylated triacrylate). An example of a compound wherein the polyalkylene oxide group contains from four to six alkylene oxide groups is Sartomer 499 (ethoxylated TMPTA). Examples of polyacrylated urethanes are Sartomer CN 953, Sartomer CN 961, Sartomer CN 963, Sartomer CN 964, Sartomer CN 970, Sartomer CN 971, Sartomer CN 972, Sartomer CN 975, Sartomer CN 980; Radcure Ebecryl 270, Ebecryl 284, Ebecryl 285, Ebecryl 4830, Ebecryl 8301, Ebecryl 8402, Ebecryl 8804, Ebecryl 220, Ebecryl 6602; Henkel 6210.

Examples of mono vinyl functional reactive diluents are Sartomer 203, Sartomer 232, Sartomer 244, Sartomer 256, Sartomer 285, Sartomer 339, Sartomer 395, Sartomer 440, Sartomer 493, Sartomer 506; Radcure IBOA, Radcure ODA.

The tinting materials may be organic or inorganic dyes or pigments, photochromic materials, metallic particles, and the like. Six dyes and pigments include but, are not limited to, Orasol Brown 2GL, 70 Savinyl Dark Violet R, Methyl Violet B Base, Sudan Black B, Methyl Violet ZB, Oil Red O, Fat Brown RR, Orasol Orange RG, Orasol Blue GN, Zapon Brown 287, Zapon Red 335, Zapon Black X51, Orasol Black RLI and Oil Red EGN. Exemplary pigments include Cromophtal Yellow 8G, Cromophtal Yellow 3G, Cromophtal Yellow GR, Cromophtal Scarlet R, Cromophtal Brown 5R, Cromophtal Red 3B, Cromophtal Violet B, Cromophtal Blue 3R, Irgazin Yellow 2GLTE, Irgazin Yellow 3RTLN. Organic pigments which are particularly stable to UV light are in the Irgalite yellows: LBT, LBIW; Irgalite rubins: L4BY, L4BN, LPBC; and Irgalite blues: LGLB, BCFR, GLSM, and GLA. Other useful pigments are Irgalite rubin L4BF, Irgalite blue LG and GLG and Irgalite red RBS, L2BN and 3RS. Pigment preparations known as Microlith WA (soluble in N-vinyl-2-pyrrolidone); Microlith T (slightly soluble in acrylic acid esters and methyacrylic acid esters); and Microlith K (slightly soluble in MMA and other low molecular weight polymers), are useful. A preferred pigment preparation is Microlith T.

As indicated above, each of the tinting formulations, will contain a photoinitiating amount of a photoinitiator, usually in a proportion of 0.05 to six parts, preferably 0.1 to. 2.0 parts. Examples of such photoinitiators are Darocure 1173 (2-hydroxy-2-methyl-1-phenylpropan-1-one, Irgacure 184, 907 (2-methyl-1-[4-(methylthio)phenyl]-2-morpholinopropanone-1) or 500 (1-hydroxycyclohexylphenyl ketone: benzophenone, 1:1 mixture), CIBA-Geigy GC 4265, or CIBA-Geigy CG 1700.

Finally, the formulations may contain viscosity modifiers, such as alcohols (typically n-propanol and/or n-butanol) or acrylate esters, dyes or surfactant (such as surfactant FC4.30, sold by 3M). In a preferred embodiment, dye will be a component of the coating formulation.

In one embodiment, with the partially cured coating on the mold, the mold is then filled with the hardenable organic material which forms the ophthalmic lens. This organic material is a polymerizable composition, and the polymer formed thereby, curable by UV light. Any of such UV-curable organic material used to make ophthalmic devices, such as lenses, may be utilized.

A preferred polymerizable organic material comprises:

I. 10 to 80 parts of polyacrylated alkane polyols, wherein the alkane polyols contain up to about 20 carbon atoms and greater than 2 up to about 10 O-acryloyl groups; and II. 80 to 10 parts of polyalkoxylated polyacrylated alkane polyols, wherein the alkoxylated alkane polyols contain up to about 20 carbon atoms and greater than 2 up to about 10 O-acryloyl groups;

III. up to 60 parts, and preferably at up to 30 parts, of urethane oligomers end-terminated with acrylate or methacrylate (or mixtures of acrylate and methacrylate) groups and preferably containing 2 to 10 acrylate groups;

IV. conventional optional additives, including but not limited to free radical initiators, UV absorbers, mold release agents, stabilizers, dyes, antioxidants, and wetting agents.

All parts are by weight described herein.

This polymerizable composition can be cast using UV radiation to produce an optically transparent object that has impact and abrasion resistance approximately equal to or better than CR-39. In one embodiment, the polymerizable lens composition has a viscosity of greater than 200 cps.

In a preferred embodiment, this polymerizable lens composition is cast using the sequential polymerization method, as described in more detail below, in a time ranging from 10 minutes to 30 minutes depending on the polymerizable composition, initiator concentration, and UV intensity employed. Relatively high viscosity polymerizable solutions can be cast using the sequential polymerization method since the fluid can be introduced into the mold cavity without entrapping air. The ability to use high viscosity polymerizable solutions allows flexibility in choosing the kind and concentration of monomer and oligomer.

As used herein, the term "aryl" or "aromatic" refers to phenyl, phenyl substituted with alkyl or halogen, naphthalene or naphthalene substituted with alkyl or halogen, or higher aromatics, either unsubstituted, or substituted with alkyl or halogen, or other substituent which does not interfere with the curing reactions.

As used herein, the term (meth)acrylate refers to either acrylate, methacrylate, or a mixture of acrylate and methacrylate.

The term aralkyl refers to an aryl group with an alkyl substituent.

The term alkaryl refers to an alkyl group that has an aryl substituent.

The term alkenyl, as referred to herein, and unless otherwise specified, refers to a straight, branched, or cyclic (in the case of $C_{5-6}$) hydrocarbon of $C_2$ to $C_{20}$ with at least one double bond.

As used herein, the term oligomer refers to a compound with about 20 or less repeating units, of typical weight average molecular weight ranging from 400 to 9000, and preferably, between 800 and 2500.

As used herein, the term aliphatic refers to an alkyl, alkenyl, or alkynyl group of $C_1$ to $C_{20}$.

As used herein, the term "chain polymerization" refers to a polymerization process in which there is a series of reactions each of which consumes a reactive particle and produces another, similar particle. The reactive particles are radicals, anions, or cations. The polymerization of reactive particles occurs without elimination of a small molecule (as in during a typical condensation reaction). Chain polymerization is typically carried out with ethylenically unsaturated monomers.

As used herein, the term "unsaturated hydrocarbon polymer" refers to a polymer that consists essentially of carbon and hydrogen atoms, and that includes alkene (vinyl) groups in the polymer.

As used herein, the term "high impact resistance" refers to a material that will withstand sudden imposition of sudden force without fracture, and that passes the U.S. Food and Drug Administration's requirement for impact resistance for ophthalmic lenses (the standard drop-ball test).

As used herein, the term "high scratch resistance" material refers to a material that will withstand abrasion without substantial surface deterioration. A typical abrasion test consists of applying a known vertical pressure on the sample, while moving a steel-wool pad laterally against the surface. Visible scratches are then counted after a number of rubbing movements. A high-scratch resistant material will exhibit only a few scratches after this process. Alternatively, the haze of the sample may be compared before and after scratching. High scratch resistant materials are considered to have a haze gain value below 10%.

Initiator

Any UV or thermal free radical initiator or mixture of initiators known to those skilled in the art of free radical polymerization can be used to initiate polymerization. Mixtures of the photoinitiators are sometimes preferred since they can in certain cases provide a more efficient production of radicals. The initiator should be non-yellowing, have a broad absorption spectrum if it is a UV initiator, and good curing efficiency. It should also be nontoxic and have low odor. Concentrations of the initiator in the polymerizable composition typically range from 0.05 to 10% by weight, although any amount can be used that provides the desired product. A relatively low concentration of initiator, between 0.1 to 2.0% by weight, is preferred to reduce yellowing.

There are a number of non-yellowing commercially available UV initiators. Examples include but are not limited to Irgacure 184 (1-hydroxycyclohexyl phenyl ketone), and Darocur 2959 or 1173 sold by Ciba Geigy Corporation, and KIP 100F (2-hydroxyalkyl phenone) sold by Fratelli Lamberti Esacure. KIP 100F and Darocur 2959 and 1173 are liquids, that are readily miscible with the other components of the polymerizable composition. Irgacure 184 is a white powder with extremely good absorbance and non-yellowing properties.

Other UV and thermal initiators include benzophenone, trimethylbenzophenone, isopropylthioxanthone, and ethyl 4-(dimethylamino)benzoate, benzoyl peroxide, acetyl peroxide, lauryl peroxide, azobisisobutyronitrile, t-butyl peracetate, cumyl peroxide, t-butyl peroxide, t-butyl hydroperoxide, bis(isopropyl)peroxydicarbonate, benzoin methyl ether, 2,2'-azobis(2,4-dimethylvaleronitrile), tertiarybutyl peroctoate, phthalic peroxide, diethoxyacetophenone, and tertiarybutyl peroxypivalate, diethoxyacetophenone, 1-hydroxycyclohexyl phenyl ketone, 2,2-dimethoxy-2-phenyl-acetophenone, phenothiazine, and diisopropylxanthogen disulfide.

Inhibitors

Inhibitors are optionally added to the polymerizable composition to inhibit polymerization under normal storage conditions, by acting as radical scavengers. Any inhibitor known to those skilled in the art can be used in any effective concentration. The most common inhibitors are hydroquinone (HQ) and hydroquinone monomethylether (MEHQ). HQ has been found to increase yellowing at high concentrations while MEHQ does not. Inhibitor levels should be minimized since they retard the speed of the initiation and propagation process during polymerization. Typical concentrations in the final formulations are optimally between 0.002 to 0.2 weight percent.

UV Stabilizers

Stabilizers can be used to prevent changes in optical properties with time. These include UV absorbers (UVA), hindered light amine stabilizers (HALS) and antioxidants (AO). UVAs preferentially absorb incident UV radiation, thereby preventing the radiation from reaching the casted polymer. Examples include Tinuvin 328, Tinuvin 900, and Tinuvin 1130 from Ciba Geigy. HALS do not function by absorbing UV radiation, but inhibit degradation of the casted polymer by binding with free radicals. Examples include Tinuvin 292, and Tinuvin 144 from Ciba Geigy. AOs also terminate free radicals, particularly those associated with peroxy radicals. They are not generally used as light stabilizers. Examples include Irganox 1010 and Irganox 1076 from Ciba Geigy.

The optical material can also be protected from UV radiation after casting, by applying an anti-UV coating or by dipping the lens in a suitable solution.

Other Additives

Internal mold releases can be added to the polymerizable composition to improve releasability from the molds, but are not required, and if possible, should be avoided as they can reduce clarity. Examples of release agents include butyl stearate, dioctylphthalate, Zelec UN and Zelec NE sold by E.I. DuPont NeMours and Company. Other additives, such as dyes and wetting agents, can also be included.

Process of Polymerization to Make Lenses

Casting a polymerizable composition to make a lens is preferred using the sequential polymerization technique taught in U.S. Pat. Nos. 5,110,514 and 5,114,632 to Soane. The sequential polymerization method minimizes stress and cavitation, or voids caused by the shrinkage of material during polymerization, that would other wise cause material stress and decrease mold replication reliability. The sequential process is easily adapted to either radiation or thermal curing. Radiation curing is preferred because it is more convenient and in general requires a shorter cure time. Radiation curing can be performed at moderately elevated temperatures to further reduce polymerization time.

The preferred apparatus for the production of a lens from a polymerizable composition preferably includes a mold comprising a convexed and concaved surface defining the front and back surfaces of the lens to be formed wherein the space between the convexed and concaved surfaces of the mold form the internal cavity corresponding to the precise dimensions of the lens to be produced, capable of transmitting energy that is capable of initiating polymerization; an opening in the mold wherein the polymerizable composition may be introduced and added during the course of the polymerization; a source or sources of energy capable of initiating polymerization placed such that the energy is irradiated through the convexed and/or the concaved face of the mold; a moveable stage or stages comprising an adjustable slit, placed between the mold and the source of energy, that is capable of exposing the polymerizable composition in a sequential manner by moving the slit over the face of the mold beginning at a point opposite to that wherein the polymerizable composition is introduced and proceeding to the point wherein the polymerizable composition is introduced.

After applying the tinting composition on the surfaces of one or both halves of the mold and partially curing, if necessary, the core resin composition, prepared by combining the appropriate polymerizable components with the photochemical initiator, is introduced into the mold.

If a primer is first needed on the lens in order to adhere the tinting coating or if multiple coatings are utilized, such as three coatings of each of the three primary colors, then it is preferred that the lens first be made in the mold, released from the mold and coated in separate steps using spin coating or dip coating for the successive primer and coating layers, as necessary.

The mold halves which are both UV transmissive, are held together by a housing system. A flexible gasket is sandwiched between and around the molds to hold the resin. The polymerizable fluid is poured into a reservoir and introduced between two mold halves. The resin is introduced into the bottom of the mold under positive pressure. Pressure of between 25 and 35 psi was maintained on the fluid during the entire process. The fluid was retained between the molds using a flexible PVC gasket and clamp assembly. Sequential polymerization is carried out on both sides beginning at point opposite to that wherein the polymerizable composition is introduced, and proceeding to the point wherein the polymerizable composition is introduced. The composition is sequentially polymerized using mercury vapor lamps and a horizontal slit assembly describe above and in U.S. Pat. No. 5,114,632. The slit opening was varied from 0.25 to 1.0 inches. The sequential polymerization time varied between 8 to 27 minutes.

The fluid polymerizable lens composition, that is contained in the reservoir, is constantly resupplied to the cavity. A positive pressure, typically between 20 and 50 psi, is applied to the reservoir during the polymerization step. The optimal pressure is dictated by the flow arrangement, system viscosity, and rate of cure. Thus, as polymerization occurs in the region exposed to light, the shrinkage that occurs is immediately replenished by additional polymerizable composition. The polymerizable composition is highly mobile and flows readily to fill the volume lost during shrinkage of the part of the mixture that has already polymerized. The nearly instantaneous replacement of the space formed by shrinkage with unreacted fluid ensures a final object that is virtually defect free and distortion less.

Other similar schemes may be envisioned to produce the lens. Instead of a slit, a curtain may be lowered (or raised) first exposing UV light to the area opposite the feed port. The curtain is moved until the entire lens is exposed. Note that for this arrangement, the UV exposure time is not constant throughout the sample, but depends on position. Another arrangement includes continually opening a slit starting from the center of the lens. Here, the central portion of the lens will have the longest exposure to the UV light. A disadvantage of this scheme is that two feed ports Is required at opposite ends of the direction the slit opens.

Only one port is required if instead of an increasingly expanding slit, an expanding hole is employed. This may be accomplished using an iris diaphragm. With the diaphragm, the initial UV exposure area is a small circular hole at the center of the lens assembly. This exposure area is radially increased by opening the diaphragm. By continuously opening the diaphragm, the entire lens assembly can be fully exposed. Since the edge will be the final area exposed to UV light, only one port is necessary for this process. The expansion rate will require adjustment depending on the reactivity of the sample, the UV intensity, and the thickness of the part being irradiated. The lens assembly may be held vertically or even horizontally during the curing process.

In an optional embodiment, after sequential polymerization is completed, a post cure step can be carried out wherein the entire mold cavity is exposed to blanket UV radiation. To ensure that defects do not appear, post curing should be carried out only when the entire lens is at a sufficiently advanced-stage of cure that shrinkage is minimal. Post curing is preferably performed while the article is still in the mold to prevent oxygen inhibition of the curing process. At the completion of the curing process, the mold structure can be taken apart and the precision cast part removed.

The equipment described above can be used to produce spherical, progressive and aspheric lenses.

The composition is preferably cured by exposure to radiation, such as radiation from a high energy ultraviolet light source. Typical UV radiation sources include an electrodeless tube lamp (made by Fusion Systems) or a medium pressure mercury vapor lamp tube (made by American Ultraviolet Products). The preferred wavelengths for photoinitiation are between 180 and 500 nanometers and the power output of the light source is preferably between about 5 and 500 watts.

Abrasion and Scratch Testing

The abrasion and scratch resistant properties of the coated lenses may be measured using the Bayer and Steel Wool tests respectively. In the Bayer test, a curved circular coated piece approximately 3 inch diameter is held tightly onto the bottom of a tray using clamps. A reference piece of the same curvature, diameter and thickness is also attached. Two holes are cut on the plate, one directly above the sample and the other above the reference piece. The plate is then filled with a known weight of a coarse grade sand. The entire assembly (plate, samples, and sand) is oscillated with an amplitude of 2.5" at a period of 100 cycles/minutes for two minutes. Oscillation is achieved using a motor that is connected to the oscillating plate through a revolving wheel. The same and the reference are then removed and the haze gain caused by the abrading sand is measured. Only fresh sand is used for each measurement. Results are based on uncoated CR-39 plates having a value of 1.0.

For a steel wool test, a test sample with known curvature is held tightly onto the base of a oscillating table using double sided tape. Steel wool abrasive (grade #000) is attached to a block with a 1×1 $in^2$ face and a complementary curvature also with double sided tape. The block is attached to a rod and the assembly is mounted directly above the sample with the steel wool in contact with the test piece. The rod is held using bushings so that it moves freely in the vertical direction but not in the horizontal plane. A 5 lb weight is added to obtain the desired pressure on the sample. Pressure is calculated by adding up the weights (including the block and the rod) and dividing this by the area. The same is then oscillated against the steel wool. The amplitude of oscillation is 2" and the period is 100 cycles per minute. The test is concluded at the end of 100 cycles. Results are reported as haze gain after the sample is subjected to the testing.

The haze gain is obtained by measuring light transmission through the sample before and after testing. This is performed using a Perkin Elmer UVV-is spectrophotometer.

Adhesion Testing

Adhesion of the coating to the lens core is conducted by soaking the lens sample in boiling salt water for one hour and then subjecting the coating to cross-hatch testing as described in ASTM D-3359. Acceptable adhesion means that none of the coating was removed during the test.

EXAMPLES

SAMPLE PREPARATION

TINT INCORPORATION INTO PRIMER OR TOP-COAT

The coating or primer material was held at a temperature between 20 and 60 C such that the viscosity was below about 500 cps. Sufficient dye was added to give a solution of the desired absorbency, generally 0.1 to 5.0 percent by weight. The dye was dissolved with stirring over a period of about an hour. The warm solution was pressure filtered through a frit with pore size of 0.8 micron or less, then allowed to cool to ambient temperature. The coating used contained poly-acryloylated alkane polyols and acrylated alkane polyols according to the invention. The primer contained acrylated polyurethane oligomer, poly acryloylated alkane polyol and diluent.

SPIN COATING AND UV CURING

A substrate sample, about 3 inches in diameter and ⅛ inch thick, was mounted on the spin table of the spin coating apparatus. In all cases the substrates were polycarbonate lenses or flats. While spinning at about 150 rpm, the sample surface was washed with isopropyl alcohol, then the speed was increased to 2000–3000 rpm and held until sample surface was dry, about 30–60 seconds. While spinning at about 150 rpm, the primer layer, with or without the tinting material included, was applied with a pipette to the substrate surface, working from the center to the edge of the sample, to give a uniform coating layer. The spin speed was then increased to the range 1000–6000 rpm and held for 15–90 seconds until the desired layer thickness was achieved, generally in the range of 1–50 microns. The wet coated substrate was placed in an enclosed chamber with a quartz window, nitrogen was purged through the cavity, then the chamber with sample was passed on a conveyor belt under a Fusion Systems UV H Lamp to cure the primer layer. Total irradiation time for the primer was 1–10 seconds. The coated sample was returned to the spin table, then the topcoat, with or without the tinting material included, was applied by pipette across the slowly spinning cured primer sample surface. The spin speed was then increased to the range 1000–6000 rpm and was held for 15–90 seconds until the desired layer thickness was achieved, generally in the range of 1–50 microns. The wet coated primer/substrate was placed in the chamber with, a quartz window, nitrogen was purged through the cavity, then the chamber was passed on a conveyor belt under a Fusion Systems UV H Lamp to cure the topcoat layer. Total irradiation time for the topcoat layer was 1–10 seconds. The wavelengths of maximum absorption and MacBeth transmission values for various samples are given below.

TABLE 1

SINGLE TINTED LAYER
SINGLE TINTED TOPCOAT

| EXAMPLE | SIDE COATED | COATING LAYER | COATING THICKNESS MICRONS | DYE ID # | SAMPLE MAXIMUM ABSORB WAV'LENGTH nm | SAMPLE MAC BETH TRANSM'N VALUE –DOT |
|---|---|---|---|---|---|---|
| 1 | FRONT | TOPCOAT | 4.6 | 17 | 550 | –88 |
| 2 | FRONT | TOPCOAT | 3.9 | 17 | 550 | –83 |
| 3 | FRONT | TOPCOAT | 2.9 | 17 | 550 | –73 |
| 4 | FRONT | TOPCOAT | 8.4 | 5 | 495 | –78 |
| 5 | FRONT | TOPCOAT | 5.7 | 5 | 495 | –65 |
| 6 | FRONT | TOPCOAT | 3.9 | 5 | 495 | –49 |
| 7 | FRONT | TOPCOAT | 16.4 | 9 | 598 | –31 |
| 8 | FRONT | TOPCOAT | 8.4 | 9 | 598 | –24 |
| 9 | FRONT | TOPCOAT | 5.7 | 9 | 599 | –17 |
| 10 | FRONT | TOPCOAT | 11.1 | 6 | 508 | –92 |
| 11 | FRONT | TOPCOAT | 5.7 | 6 | 509 | –73 |

TABLE 2

DUAL LAYER (ONE TINTED), ONE SIDE
DUAL COAT, CLEAR PRIMER, TINTED TOPCOAT

| EXAMPLE | SIDE COATED | COATING LAYER | COATING THICKNESS MICRONS | DYE ID # | SAMPLE MAXIMUM ABSORB WAV'LENGTH nm | SAMPLE MAC BETH TRANSM'N VALUE –DOT |
|---|---|---|---|---|---|---|
| 12 | FRONT | PRIMER | 9.0 | NONE | 581 | –49 |
|  | FRONT | TOPCOAT | 7.0 | 1 |  |  |
| 13 | FRONT | PRIMER | 9.0 | NONE | 581 | –58 |

TABLE 2-continued

DUAL LAYER (ONE TINTED), ONE SIDE
DUAL COAT, CLEAR PRIMER, TINTED TOPCOAT

| EXAMPLE | SIDE COATED | COATING LAYER | COATING THICKNESS MICRONS | DYE ID # | SAMPLE MAXIMUM ABSORB WAV'LENGTH nm | SAMPLE MAC BETH TRANSM'N VALUE −DOT |
|---|---|---|---|---|---|---|
|  | FRONT | TOPCOAT | 12.1 | 1 |  |  |
| 14 | FRONT | PRIMER | 9.0 | NONE | 598 | −13 |
|  | FRONT | TOPCOAT | 7.0 | 3 |  |  |
| 15 | FRONT | PRIMER | 9.0 | NONE | 599 | −25 |
|  | FRONT | TOPCOAT | 16.2 | 3 |  |  |
| 16 | FRONT | PRIMER | 9.0 | NONE | 495 | −60 |
|  | FRONT | TOPCOAT | 7.0 | 4 |  |  |
| 17 | FRONT | PRIMER | 9.0 | NONE | 495 | −83 |
|  | FRONT | TOPCOAT | 16.2 | 4 |  |  |
| 18 | FRONT | PRIMER | 9.0 | NONE | 495 | −73 |
|  | FRONT | TOPCOAT | 16.2 | 5 |  |  |
| 19 | FRONT | PRIMER | 9.0 | NONE | 494 | −51 |
|  | FRONT | TOPCOAT | 7.0 | 5 |  |  |
| 20 | FRONT | PRIMER | 9.0 | NONE | 508 | −88 |
|  | FRONT | TOPCOAT | 16.2 | 6 |  |  |
| 21 | FRONT | PRIMER | 9.0 | NONE | 509 | −65 |
|  | FRONT | TOPCOAT | 7.0 | 6 |  |  |

TABLE 3

TINTED PRIMER
DUAL COAT, TINTED PRIMER, CLEAR TOPCOAT

| EXAMPLE | SIDE COATED | COATING LAYER | COATING THICKNESS MICRONS | DYE ID # | SAMPLE MAXIMUM ABSORB WAV'LENGTH nm | SAMPLE MAC BETH TRANSM'N VALUE −DOT |
|---|---|---|---|---|---|---|
| 22 | FRONT | PRIMER | 6.7 | 7 | 500 | −63 |
|  | FRONT | TOPCOAT | 7.0 | NONE |  |  |
| 23 | FRONT | PRIMER | 4.4 | 7 | 498 | −50 |
|  | FRONT | TOPCOAT | 7.0 | NONE |  |  |
| 24 | FRONT | PRIMER | 4.4 | 11 | 477 | −40 |
|  | FRONT | TOPCOAT | 7.0 | NONE |  |  |
| 25 | FRONT | PRIMER | 6.7 | 11 | 477 | −48 |
|  | FRONT | TOPCOAT | 7.0 | NONE |  |  |
| 26 | FRONT | PRIMER | 4.4 | 12 | 566 | −36 |
|  | FRONT | TOPCOAT | 7.0 | NONE |  |  |
| 27 | FRONT | PRIMER | 6.7 | 15 | 559 | −36 |
|  | FRONT | TOPCOAT | 7.0 | NONE |  |  |
| 28 | FRONT | PRIMER | 6.7 | 10 | 490 | −44 |
|  | FRONT | TOPCOAT | 7.0 | NONE |  |  |
| 29 | FRONT | PRIMER | 6.7 | 6 | 513 | −57 |
|  | FRONT | TDPCOAT | 7.0 | NONE |  |  |

TABLE 4

SINGLE TINTED LAYER ON EACH SIDE
COMBINE TWO COLORS, DUAL COAT ON EACH SIDE, CLEAR PRIMERS, TINTED TOPCOATS

| EXAMPLE | SIDE COATED | COATING LAYER | COATING THICKNESS MICRONS | DYE ID # | SAMPLE MAXIMUM ABSORB WAV'LENGTH nm | SAMPLE MAC BETH TRANSM'N VALUE –DOT |
|---|---|---|---|---|---|---|
| 30 | FRONT | PRIMER | 4.3 | NONE | 499 | –72 |
|  | FRONT | TOPCOAT | 16.2 | 3 |  |  |
|  | BACK | PRIMER | 4.3 | NONE |  |  |
|  | BACK | TOPCOAT | 7.0 | 4 |  |  |
| 31 | FRONT | PRIMER | 4.3 | NONE | 509 & 539 | –85 |
|  | FRONT | TOPCOAT | 12.1 | 1 |  |  |
|  | BACK | PRIMER | 4.3 | NONE |  |  |
|  | BACK | TOPCOAT | 7.0 | 5 |  |  |

TABLE 5

TINTED PRIMER ON EACH SIDE
COMBINE TWO COLORS, DUAL COAT ON EACH SIDE, TINTED PRIMERS, CLEAR TOPCOATS

| EXAMPLE | SIDE COATED | COATING LAYER | COATING THICKNESS MICRONS | DYE ID # | SAMPLE MAXIMUM ABSORB WAV'LENGTH nm | SAMPLE MAC BETH TRANSM'N VALUE –DOT |
|---|---|---|---|---|---|---|
| 32 | FRONT | PRIMER | 6.7 | 11 | 480 | –66 |
|  | FRONT | TOPCOAT | 7.0 | NONE |  |  |
|  | BACK | PRIMER | 6.7 | 15 |  |  |
|  | BACK | TOPCOAT | 7.0 | NONE |  |  |
| 33 | FRONT | PRIMER | 4.3 | 7 | 507 | –83 |
|  | FRONT | TOPCOAT | 7.0 | NONE |  |  |
|  | BACK | PRIMER | 6.7 | 6 |  |  |
|  | BACK | TOPCOAT | 7.0 | NONE |  |  |

TABLE 6

TINTED PRIMER ON FRONT, TINTED TOPCOAT ON BACK.
COMBINE TWO COLORS, DUAL COAT ON EACH SIDE, FRONT: TINT PRIMER CLEAR TOPCOAT, BACK: CLEAR PRIMER, TINT TOPCOAT

| EXAMPLE | SIDE COATED | COATING LAYER | COATING THICKNESS MICRONS | DYE ID # | SAMPLE MAXIMUM ABSORB WAV'LENGTH nm | SAMPLE MAC BETH TRANSM'N VALUE –DOT |
|---|---|---|---|---|---|---|
| 34 | FRONT | PRIMER | 4.3 | 11 | 474 & 559 | –47 |
|  | FRONT | TOPCOAT | 7.0 | NONE |  |  |
|  | BACK | PRIMER | 4.3 | NONE |  |  |
|  | BACK | TOPCOAT | 7.0 | 3 |  |  |
| 35 | FRONT | PRIMER | 4.3 | 12 | 500 | –91 |
|  | FRONT | TOPCOAT | 7.0 | NONE |  |  |
|  | BACK | PRIMER | 4.3 | NONE |  |  |
|  | BACK | TOPCOAT | 16.2 | 4 |  |  |

TABLE 7

TINTED PRIMER AND TINTED TOPCOAT ON FRONT
COMBINE TWO COLORS, DUAL COAT ON FRONT SIDE, TINT PRIMER & TINT TOPCOAT

| EXAMPLE | SIDE COATED | COATING LAYER | COATING THICKNESS MICRONS | DYE ID # | SAMPLE MAXIMUM ABSORB WAV'LENGTH nm | SAMPLE MAC BETH TRANS VALUE –DOT |
|---|---|---|---|---|---|---|
| 36 | FRONT | PRIMER | 4.3 | 12 | 513 | –78 |
|  | FRONT | TOPCOAT | 7.0 | 6 |  |  |
| 37 | FRONT | PRIMER | 6.7 | 4 | 497 | –87 |
|  | FRONT | TOPCOAT | 16.2 | 5 |  |  |

TABLE 8

DIFFERENT TINT MATERIAL ON FRONT AND BACK.
COMBINE TWO COLORS, DOUBLE DUAL COAT ON FRONT SIDE, CLEAR PRIMERS, TINTED TOPCOATS

| EXAMPLE | SIDE COATED | COATING LAYER | COATING THICKNESS MICRONS | DYE ID # | SAMPLE MAXIMUM ABSORB WAV'LENGTH nm | SAMPLE MAC BETH TRANSM'N VALUE –DOT |
|---|---|---|---|---|---|---|
| 38 | FRONT | PRIMER #1 | 4.3 | NONE | 497 | –83 |
|  | FRONT | TOPCOAT #1 | 16.2 | 6 |  |  |
|  | FRONT | PRIMER #2 | 4.3 | NONE |  |  |
|  | FRONT | TOPCOAT #2 | 16.2 | 5 |  |  |

TABLE 9

DYE IDENTIFICATION NUMBERS.

| DYE ID # | DYE NAME |
|---|---|
| 1 | ORASOL BLACK RLI |
| 3 | THERMAL PLAST BLUE 684 |
| 4 | ORASOL ORANGE RG |
| 5 | ORASOL ORANGE 2GL |
| 6 | ZAPON RED 335 |
| 7 | OIL RED EGN |
| 9 | ORASOL BLUE GN |
| 10 | OIL RED O |
| 11 | ZAPON BROWN 287 |
| 12 | ZAPON BLACK X51 |
| 15 | DARK VIOLET |
| 17 | SUDAN BLACK |

What is claimed is:

1. A method of tinting a plastic lens comprising the steps of:
   (a) applying a curable primer containing a tinting agent onto a surface of said lens;
   (b) curing said primer;
   (c) applying a liquid, curable coating containing the same or different tinting agent over said primer;
   (d) curing to harden said coating.

2. A method according to claim 1 wherein said primer is optically clear.

3. A method according to claim 1 wherein said liquid, curable primer comprises:
   I) Thirty to eighty parts of an acrylated material which promotes adhesion of the cured primer coating to the substrate;
   II) One to seventy parts of a mono vinyl functional reactive diluent; and
   III) Optionally, one to fifty parts of alkane polyols, wherein the alkane polyols contain up to about forty eight carbon atoms and average at least two O-[acryloyl (polyalkylene oxide)] chains; wherein each of the polyaikylene oxide chains comprise from one to twenty alkylene oxide groups;
   IV) Optionally, a tinting material selected from dyes, pigments and mixtures thereof in an effective tinting amount.

4. A method according to claim 1 wherein said liquid radiation-curable coating comprises:
   I) Ten to fifty parts of polyacryoylated alkane polyols, said alkane polyols containing up to about twenty carbon atoms and an average of at least three O-acryloyl groups; and
   II) Twenty to eighty parts of alkane polyols, said alkane polyols containing up to about twenty carbon atoms and an average of at least three O-[acryloyl-(polyalkylene oxide)] chains; wherein each of said polyalkylene oxide chains comprise from one to twenty to alkylene oxide groups.

5. A method according to claim 1 wherein said liquid radiation curable coating comprises:
   I) Twenty to forty parts of polyacryoylated alkane polyols, said alkane polyols containing up to about twenty carbon atoms and an average of at least three O-acryloyl groups; and
   II) Fifty to eighty parts of alkane polyols, said alkane polyols containing up to about twenty carbon atoms and an average of at least three O-[(acryloyl-(polyalkylene oxide)] chains; wherein each of said polyalkylene oxide chains comprise from one to twenty alkylene oxide groups.

6. A method according to claim 5 wherein component I is a compound or mixture of compounds of the formula

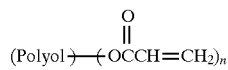

wherein n represents an average number greater or equal to 3.

7. A method according to claim 5 wherein said polyol in component II is a compound or mixture of compounds the formula

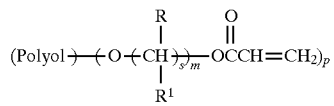

wherein p represents an average number greater or equal to three; each m is independently an integer from one to twenty; s is from one to six, and each R and $R^1$ group is independently H or lower alkyl.

8. A method of tinting a plastic lens comprising the steps of
    (a) applying a first curable coating comprising a tinting agent over said lens;
    (b) curing to harden said first coating;
    (c) applying a liquid, curable second coating over said first coating;
    (d) curing to harden said second coating.

9. A method according to claim 8 wherein said second coating is cured by exposure to actinic light.

10. A method according to claim 9 wherein said actinic light-curable dye contains colloidal anti-reflection particles to vary the optical density of said coating.

11. A method according to claim 8 wherein said second coating is thermally cured.

12. The method according to claim 8 wherein said first or second coating is applied by spin coating.

13. A method according to claim 8 wherein said first or second coating is applied by dipping said lens into the respective coating material.

14. The method according to claim 8 wherein said second coating is optically clear after curing.

15. A method according to claim 8 further comprising the step of applying at least one additional curable coating over said cured coating or said primer where at least one of said additional coatings contains a tinting agent.

16. A method according to claim 15 comprising the steps of applying at least three liquid, curable coatings, each of said coatings containing a tinting dye or pigment of a different primary color.

17. A method according to claim 8 wherein at least one of said liquid, curable coatings is applied to each side of said lens.

18. A method according to claim 17 wherein the tinting agent on one side of said lens is different from the tinting agent on the other side of said lens.

19. A method according to claim 8 wherein said curable coating contains colloidal inorganic or metallic particles which impart an iridescent or metallic appearance to said lens.

20. A method according to claim 2 or 8 wherein said curable coating contains a photochromic dye.

21. A method according to claim 8 wherein said liquid, curable coating comprises:

I) Twenty to seventy parts of alkane polyols, wherein the alkane polyols contain up to about forty eight carbon atoms and average at least three O-[acryloyl-(polyalkylene oxide)] chains; wherein each of the polyalkylene oxide chains comprise from one to twenty alkylene oxide groups;

II) Fifteen to seventy five parts of a polyacrylated urethane, wherein the urethane has a molecular weight of about 2500 or less and an average of at least three acrylate groups;

III) A tinting material selected from dyes, pigments and mixtures thereof in an effective tinting amount and IV) Optionally, twenty to seventy parts of polyacryloylated alkane polyols, wherein the alkane polyols contain an average of at least three O-acryloyl groups;

V) Optionally, one to twenty five parts of a mono vinyl functional reactive diluent.

22. A method according to claim 8 wherein said liquid radiation curable coating comprises:

I) Ten to fifty parts of polyacryoylated alkane polyols, said alkane polyols containing up to about twenty carbon atoms and an average of at least three O-acryloyl groups; and II) Twenty to eighty parts of alkane polyols, said alkane polyols containing up to about twenty carbon atoms and an average of at least three O-[acryloyl-(polyalkylene oxide)] chains; wherein each of said polyalkylene oxide chains comprise from one to twenty to alkylene oxide groups.

23. A method according to claim 8 wherein said liquid radiation curable coating comprises:

I) Twenty to forty parts of polyacryoylated alkane polyols, said alkane polyols containing up to about twenty carbon atoms and an average of at least three O-acryloyl groups; and II) Fifty to eighty parts of alkane polyols, said alkane polyols containing up to about twenty carbon atoms and an average of at least three O-[acryloyl-(polyalkylene oxide)] chains; wherein each of said polyalkylene oxide chains comprise from one to twenty alkylene oxide groups.

24. A method according to claim 8 wherein component I is a compound or mixture of compounds of the formula

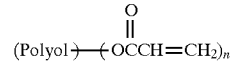

wherein n represents an average number greater or equal to 3.

25. A method according to claim 8 wherein said polyol in component II is a compound or mixture of compounds the formula

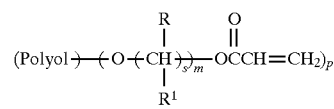

wherein p represents an average number greater or equal to three; each m is independently an integer from one to twenty; s is from one to six, and each R and R' group is independently H or lower alkyl.

* * * * *